CARRIER TELEGRAPH REPEATER

Original Filed Dec. 30, 1942

2 SHEETS—SHEET 1

INVENTOR
L.C. ROBERTS
BY R. C. Terry
ATTORNEY

Aug. 12, 1952 L. C. ROBERTS 2,606,961

CARRIER TELEGRAPH REPEATER

Original Filed Dec. 30, 1942 2 SHEETS—SHEET 2

INVENTOR
L. C. ROBERTS
BY
R. C. Terry
ATTORNEY

Patented Aug. 12, 1952

2,606,961

UNITED STATES PATENT OFFICE 2,606,961

CARRIER TELEGRAPH REPEATER

Leland C. Roberts, West Orange, N. J., assignor to Bell Telephone Laboratories, Incorporated, New York, N. Y., a corporation of New York Original application December 30, 1942, Serial No. 470,575, now Patent No. 2,495,773, dated January 31, 1950. Divided and this application January 26, 1950, Serial No. 140,670

12 Claims. (Cl. 178—2)

Figure 1:
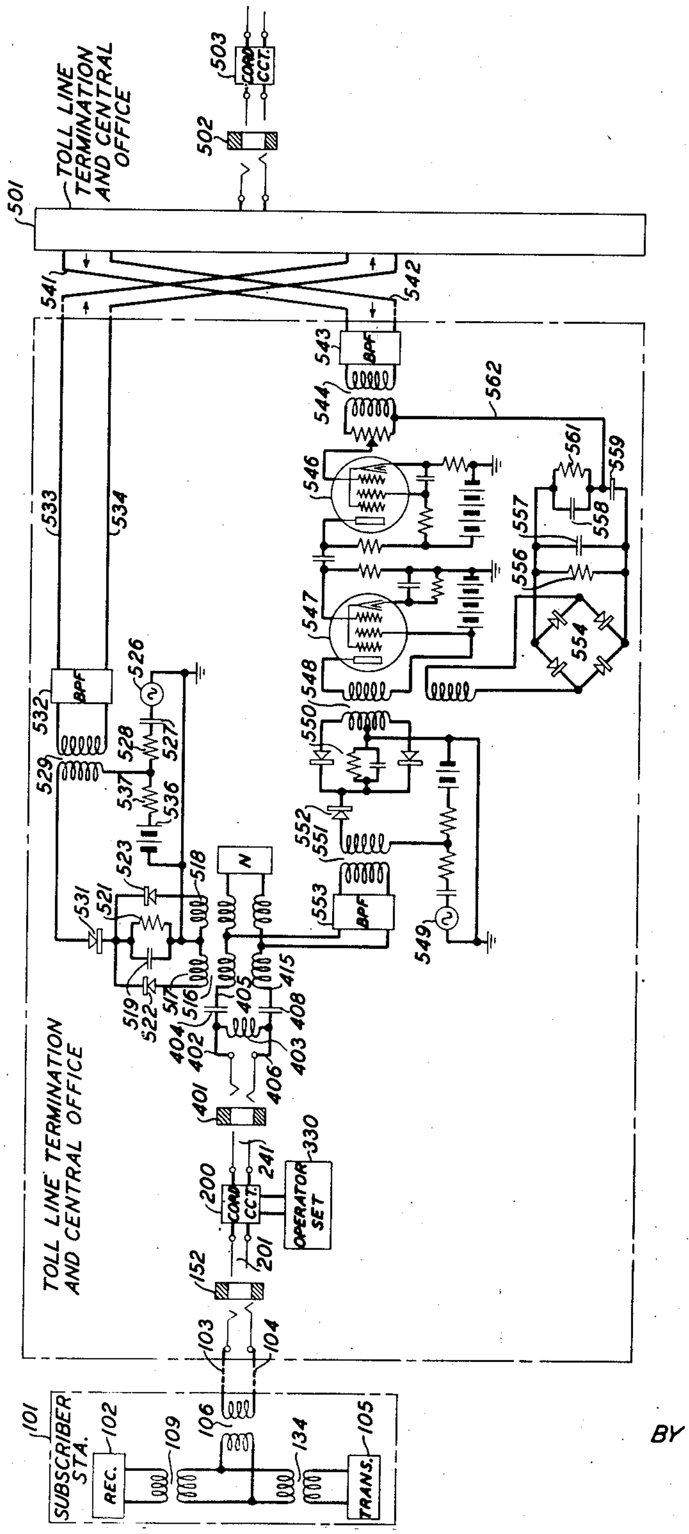

This invention relates to printing telegraph apparatus systems and particularly to a teletypewriter exchange system.

This application is a division of copending application Serial No. 470,575, filed December 30, 1942, now Patent No. 2,495,773, issued Jan. 31, 1950.

An object of the invention is to interconnect subscribers' stations equipped to transmit and receive alternating-current signals over toll lines arranged to carry alternating-current signals.

Another object of the invention is to provide a regenerative repeater for regenerating attenuated or otherwise deteriorated alternating-current signals.

Another object of the invention is to transpose the marking and spacing signal conditions of alternating current, such as no-current and current, respectively, to the opposite conditions of current and no-current, respectively, and vice versa.

The invention features signal level compensation apparatus associated individually with intertoll trunks whereby a substantial saving in apparatus to be installed and maintained is accomplished as contrasted with the provision of signal level compensation apparatus associated with each subscriber's loop since the number of trunks in a system is usually a small fraction of the number of subscribers' loops served thereby.

In accordance with the invention, and as more fully described in the copending application, the subscribers' stations are individually provided with a source of alternating current which generates alternating current at the signaling frequency. The application of trains of alternating current waves to the subscriber's line is controlled by transmitting contacts, and transmitted alternating current as well as received alternating current is amplified by a local amplifier and is rectified for the purpose of operating a printing telegraph receiving recorder which records received messages, and in the case of locally generated signals, produces a home record of those signals. The subscriber's station operates upon a basis of alternating current off for marking signals and on for spacing signals, this arrangement providing for alternating current off at the subscriber's station while signals are being received, so that the receiving amplifier is responsive to received trains of alternating-current waves without interference from locally generated alternating current, whereas it would not respond to received trains of alternating-current waves separated by no-current intervals if the subscriber's transmitter, in the idle condition, should be applying steady alternating current to the receiving amplifier.

At the central office station, cord circuits arranged to carry alternating-current signals between two subscribers' line circuits or between a subscriber's line circuit and a trunk circuit are individually associable by means of keys with an operator's set which is similar to a subscriber's transmitting and receiving set, in that it generates alternating current for signaling, amplifies and rectifies received signals, and also amplifies and rectifies locally generated signals for the operator's home record.

Connections between subscribers served by different central office stations are established over intertoll trunk circuits extending between the two central office stations. At each end the receiving sides of the trunk circuit are provided with receiving amplifiers which have automatic gain control features. Since the gain of such amplifiers is at maximum when no signal is being received and such amplifiers will then be most sensitive to noise disturbances and also to the beginnings of incoming signals, it is preferable to have the lines interconnecting the central office stations energized by alternating current for the idle or marking condition in order to hold the gain of the receiving amplifiers to normal level. Accordingly, at each end of the trunk in the transmitting side there is a signal conversion circuit for converting current-on spacing signals received from a cord circuit to current-off spacing signals and, conversely, for converting current-off marking signals received from a cord circuit to current-on marking signals.

When alternating-current trains of waves are transmitted over long toll lines the signals may become impaired such as by tapering off of the amplitude of the beginnings or ends of the trains of waves, so that the duration of the portions of the trains of waves at effective amplitude may be materially reduced. For the correction of this condition the invention includes a regenerative repeater for alternating-current signals which produces trains of alternating current at full amplitude for each received train of alternating current and which has timing means for allotting a full impulse interval to each produced train of alternating current independently of the duration of the portion of the received train which is of effective amplitude.

Figure 3:
Figure 2:
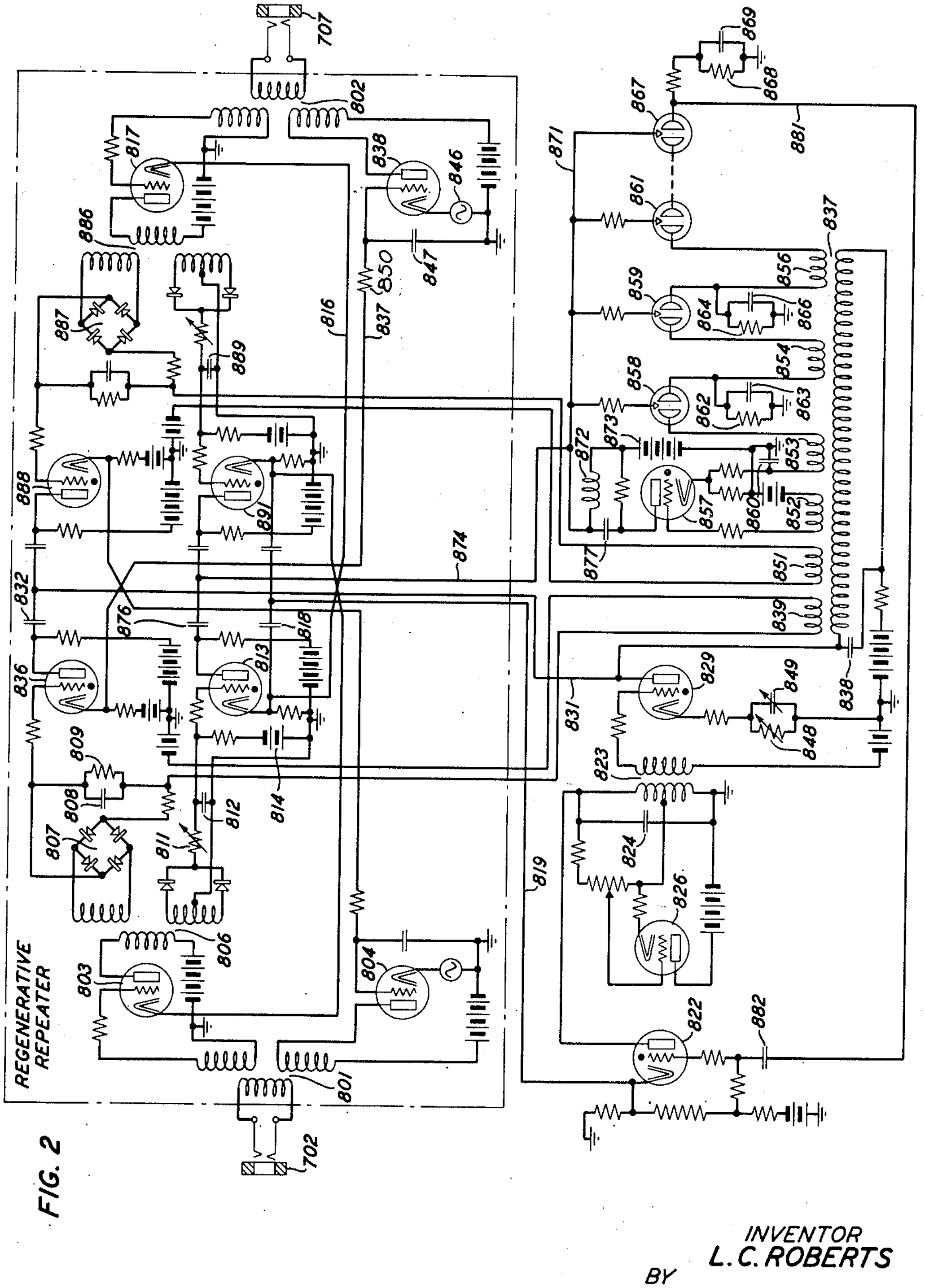

For a complete understanding of the invention, reference may be had to the following detailed description to be interpreted in the light of the accompanying drawings wherein:

Fig. 1 is a diagrammatic view showing subscriber's stations equipped to transmit and receive alternating-current signals, its line termination at a central office station, a cord circuit and operator's set at the central office, an intertoll trunk circuit extending to a remote switching office station, and a cord circuit for extending a connection from the intertoll trunk at the remote central office;

Fig. 2 is a diagrammatic view showing a regenerative repeater for regenerating alternating-current signals; and Fig. 3 is a diagrammatic view showing how Figs. 1 and 2 and a reverse or mirror image of Fig. 1, indicated in dotted outline, may be combined to show a complete system for interconnecting two subscriber stations by trunks in tandem through a regenerative repeater.

Referring to the drawings and particularly to Fig. 1, the reference numeral 101 designates a subscriber station which is represented very generally in schematic form and which may be of the type shown in Fig. 1 of the copending application. Line conductors 103 and 104 that serve the subscriber station terminate at that station in the right-hand winding of transformer 106 which is connected parallelly to one winding of each of the transformers 109 and 134. By virtue of the presence of transformers 106, 109 and 134 it will be apparent that signal transmission to and from each subscriber station is on an alternating-current basis. The transformers 109 and 134 connect receiving and transmitting equipment respectively to the transformer 106. The receiving equipment, designated by reference numeral 102 includes amplifying and rectifying equipment, as disclosed in Fig. 1 of the copending application, for converting signals to direct current to operate a teletypewriter printer, and the transmitting apparatus, designated by reference numeral 105 includes a source of alternating current for signal transmission, as also shown in Fig. 1 of the copending application. Because of the fact that the receiving equipment 102 is coupled to transmitting equipment 105 through transformers 109 and 134 the receiving equipment is arranged to respond to signals generated by the transmitting equipment and impressed through transformers 134 and 106 on the line conductors 103 and 104, the response of the receiving equipment 102 to the outgoing signals providing a home record of transmitted message material.

Line conductors 103 and 104 extend to a central office station where they terminate in the springs of line jack 152. Jack 152 is adapted to receive the answering plug 201 of a cord circuit 200 which is indicated only schematically in Fig. 1, and complete details of which are contained in Fig. 2 of the copending application. Associated with the cord circuit 200 is an operator's set 330, shown schematically in Fig. 1 but shown in complete detail in Fig. 3 of the copending application, by means of which an operator, having answered a call from subscriber station 101 by the insertion of plug 201 in jack 152, communicates with the subscriber for the purpose of ascertaining the destination of the call initiated by the subscriber. The operator's set is equipped to transmit and receive alternating-current signals. The cord circuit 200 is provided with signaling and supervisory apparatus as is fully disclosed in the copending application.

As is fully disclosed in the copending application, signal transmission between the subscriber station and the central office over the subscriber's line and through the cord circuit is on the basis of current for spacing signals and no current for marking signals. A reason for this is that the transmission of alternating current from the subscriber's transmitter during idle marking condition thereof would mask spacing signals of no current transmitted from the central office, if transmission should be on the opposite basis of current for marking and no current for spacing.

Plug 241 is the calling plug of cord circuit 200 and is adapted to be in circuit in a jack associated with a telegraph circuit over which a call initiated by the subscriber station is to be extended. For example, the plug 241 may be inserted in jack 401. The springs of jack 401 are connected to conductors 402 and 406 that are bridged by inductance 403 and are also connected to the left-hand terminals of condensers 404 and 408, respectively.

The right-hand terminals of the condensers 404 and 408 are connected by conductors 405 and 415, resectively, to a hybrid coil 516 and the spacing impulse trains of alternating current flow through the condensers 404 and 408 to this coil. The condensers 404 and 408 block off from the hybrid coil direct current which flows in conductors 402 and 406 for energizing a supervisory relay, as described in the copending application, and the inductance 403 provides a direct-current path for this current in addition to serving as a filter in combination with the condensers 404 and 408. For reasons which will be described hereinafter, it is desirable that in the trunk circuit, marking signals shall be represented by a flow of alternating current and spacing signals shall be represented by a no-current condition. Since this is the opposite of the condition in the local subscriber's line and in the cord circuit 200, it is necessary to provide a signal transposing circuit associated with the intertoll trunk circuit. This transposing circuit will now be described.

The spacing signals comprising trains of alternating current induce alternating currents at the same frequencies in windings 517 and 518 of the hybrid coil. These coils are in series, and a condenser 519 shunted by a resistor 521 has one terminal connected to the point of interconnection of the two windings 517 and 518. The other ends of the windings 517 and 518 are connected through half-wave rectifiers 522 and 523 to the other terminal of condenser 519. This circuit serves as a full-wave rectifier for rectifying the spacing trains of alternating current received over conductors 402 and 406 and for charging condenser 519 with such rectified current. There is also connected across condenser 519 and resistance 521 a circuit comprising a source of alternating current 526, which generates current at the signaling frequency, condenser 527, resistor 528, primary winding of transformer 529 and rectifier 531. When the full-wave rectifier circuit, including rectifiers 522 and 523, is charging condenser 519, the condenser blocks the flow of current from alternating-current source 526 through the primary of transformer 529 so that no current flows in that winding of the transformer. When current ceases in conductors 402 and 406, which is the marking condition, condenser 519 discharges and permits current to flow through the primary winding of transformer 529 and rectifier 531 so that a marking signal of alternating-current flow is induced in the secondary of transformer 529. Thus as a result of any spacing signal comprising alternating current, no current is generated in the secondary winding of transformer 529. This winding of the transformer is connected through band-pass filter 532 to toll line conductors 533 and 534 which extend to the remote central office station where they enter the receiving circuit of an intertoll trunk circuit identical with that shown in Fig. 1. In the signal transposing circuit, a battery 536 has one terminal connected through resistor 537, primary winding of transformer 529 to one terminal of rectifier 531 and the other terminal of the battery is connected through resistor 521 to the other terminal of rectifier 531. This battery normally biases the rectifier 531 so that it operates on the linear portion of its characteristic.

Since only one end of the intertoll trunk circuit has been shown in detail in Fig. 1, it is necessary to consider the effect of received call and other signals as if received from the remote station shown at the right of Fig. 1. Signals are received over a separate pair of receiving conductors designated by the reference numerals 541 and 542 and signals received over these conductors are impressed upon a band-pass filter 543, the output of which is connected to the primary winding of transformer 544. The reason for providing band-pass filters 532 and 543 is that the conductors 533 and 534 may carry a plurality of outgoing messages simultaneously, the different messages being characterized by different frequencies of signaling current and the conductors 541 and 542 may carry a plurality of incoming messages similarly differentiated. The band-pass filter 532 suppresses frequencies other than those intended to be transmitted from the oscillatory current source 526 and the filter 543 suppresses from the primary winding of transformer 544 all but one message frequency or band of frequencies.

The secondary winding of transformer 544 is connected to the grid circuit of an amplifier tube 546, the anode circuit of which is coupled through a resistance capacity coupling to a second stage amplifying tube 547. The anode circuit of tube 547 includes, the primary winding of an output transformer 548, the secondary winding of which is center tapped and is connected in a full-wave rectifier circuit 550 similar to that previously described comprising the hybrid coil windings 517 and 518, the rectifiers 522 and 523 and condenser 519 shunted by resistor 521. The rectifier circuit 550 controls the flow of current from a source of oscillatory current 549 through the primary winding of a transformer 551 having a half-wave rectifier 552 in the same relation to source of oscillatory current 549, the rectifier circuit 550 and the primary winding of transformer 551 that rectifier 531 has to source of oscillatory current 526, the full-wave rectifier circuit which includes condenser 519 and the primary winding of transformer 529. Thus marking intervals of oscillatory current received over the line conductors 541 and 542 are amplified in the two-stage amplifier and are transposed into marking signals of no-current condition in the secondary of transformer 551. The secondary of transformer 551 is connected to the input of a band-pass filter 553, the output of which is connected into the hybrid coil 516 whereby the transposed signals are impressed on conductors 402 and 406 by which they are conducted to the cord 200.

Transformer 548 has a tertiary winding which is connected across the input terminals of a full-wave bridge rectifier circuit 554, the output circuit of which includes resistor 556, condenser 557 shunted across resistor 556, and a series of two condensers 558 and 559 shunted across condenser 557, the condenser 558 having a resistor 561 in shunt therewith. From the point of interconnection of condensers 558 and 559, conductor 562 is connected back to the grid circuit of amplifier tube 546. The rectifier circuit 554 and associated apparatus serves as an automatic gain control system, rectifying a portion of the output of the second stage amplifier tube 547 and applying back to the grid circuit of tube 546 over conductor 562 a biasing voltage which supplements the normal biasing voltage provided by the cathode resistor of tube 546 and which varies inversely as the signal level. When a weak signal is impressed upon the grid of tube 546, the voltage impressed across rectifier circuit 554 is less than when a strong signal is received and accordingly tube 546 is biased less negatively as a result of reception of a weak signal than of a strong signal, thus a substantially constant level of signal impressed on the secondary of transformer 548 can be maintained.

The automatic gain control feature having been described, the reason for the transposition of signals so that the trunk circuits shall carry oscillatory current for the marking condition and no current for the spacing condition may be explained. The idle condition of conductors 533 and 534 will be the marking condition with oscillatory current flowing, since, with no current flowing in conductors 402 and 406, whether because of the fact that no plug is inserted into jack 401 or because of an idle interval or lull in communication between two stations connected over the trunk circuit, the signal rectifier in the transposition circuit will be receiving no signal and accordingly oscillatory current from oscillator 526 will be flowing in the primary winding of transformer 529. The same condition will be true with respect to line conductors 541 and 542 so that during the idle time the amplifier comprising tubes 546 and 547 will be amplifying the received marking signal and the gain of the amplifier wil be held down by the rectified portion of the signal in the automatic gain control apparatus. When spacing intervals of no current are received over conductors 541 and 542, the gain of the amplifier will tend to rise but the condensers in the ouput of the rectifier circuit 554 will delay such rise. If no signal transposition had been provided in the trunk circuit, there would be no current during the idle or marking condition and the biasing voltage supplied by the automatic gain control circuit would substantially or completely disappear thus greatly increasing the sensitivity of the amplifier so that extraneous disturbances received over the conductors 541 and 542 might disturb supervisory apparatus which is under the control of signals, as is described in the copending application, and abnormal amplification of the first train of oscillatory current received upon the initiation of transmission might result.

The receiving circuit terminating the intertoll trunk conductors 533—534 and 541—542 at the remote central office station is represented diagrammatically in Figs. 1 and is designated by reference numeral 501. It has a terminating jack 502 from which a call may be extended by means of a cord circuit 503 to a jack terminating a subscriber's line or other communication circuits.

It may be desirable to extend a call over another intertoll trunk to reach a subscriber station served by still another central office station. The communication path from one subscriber station to the other would then include at least two intertoll trunks connected in tandem. Because of the fact that signals transmitted over long distances, although repeated and amplified in the intertoll trunk circuit, may deteriorate due to distortion, which distortion is amplified as part of the signal by amplifier, such as the one shown in Fig. 1, it may be necessary to restore the signals to their original condition by means of a regenerative repeater which may be located at one or more intermediate central office stations and through which the intertoll trunks are interconnected. Accordingly the system shown in Fig. 3 represents, from left to right, a subscriber station and line circuit equipped to transmit alternating-current signals, a central office cord circuit and operator's set, an intertoll trunk circuit equipped to transmit alternating-current signals, a cord circuit, all of the foregoing being shown in Fig. 1, a regenerative repeater having terminal jacks, shown in Fig. 2, and a duplication of all of the apparatus and circuits shown in Fig. 1, arranged in reverse order, and ultimately terminating in a subscriber station.

The structure and operation of the regenerative repeater will be described first upon the basis of regeneration of a code signal combination entering the repeater through cord circuit 503, jack 702 and the left-hand winding of transformer 801. It should be borne in mind that since the signals enter the repeater through a cord circuit, the transmission into, through and out of the cord circuit, and into the regenerative repeater is upon the basis of no current for the marking condition and alternating-current trains for the spacing condition, the transposition from the intertoll trunk transmission condition having occurred in the intertoll trunk terminating circuit 501. Accordingly in the normal or idle marking condition no current is impressed upon the left-hand winding of transformer 801. The upper right-hand winding of transformer 801 is connected across the input circuit of an amplifier tube 803 which is preferably of the vacuum type. The lower right-hand winding of transformer 801 is connected across the output circuit of a tube 804 also preferably of the vacuum type and it will be apparent that any transfer of signals from the left-hand winding of transformer 801 into the lower right-hand winding will have no effect since the latter winding is in the output circuit of a vacuum tube. Accordingly signals impressed on the left-hand winding of transformer 801 are routed through tube 803 in which spacing impulses of oscillatory current are amplified. The grid circuit of tube 803 includes a resistor for reducing the gain of the tube when the grid becomes positive. Amplified spacing signals are impressed across the left-hand or primary winding of the transformer 806 included in the anode circuit of tube 803. Accordingly, corresponding alternating current is induced in both of the right-hand or secondary windings of the transformer. A bridge type full-wave rectifier 807 is connected across the upper secondary winding of transformer 806 and a condenser 808 shunted by a resistor 809 is connected across the output of rectifier 807. Thus direct current resulting from the rectification of a spacing train of alternating current will result in the charging of condenser 808.

The lower secondary winding of transformer 806 has two half-wave rectifiers connected to the ends thereof to form a full-wave rectifier circuit and the output of this rectifier circuit includes variable resistor 811 and condenser 812 in series. Thus the rectified spacing current will charge condenser 812 through the variable resistor 811. The variable resistor controls the timing of the charging of condenser 812 and thereby serves as an orientation adjustment to permit the most effective part of a received impulse to control the retransmission of a corresponding impulse in regenerated manner. The grid circuit of a hot cathode gas-filled trigger tube 813, the grid of which is normally biased sufficiently negative by battery 814 to prevent firing of the tube, is connected across the condenser 812 and when a sufficient positive charge has been developed across condenser 812 as a result of the rectification of a spacing signal, which will be assumed to be the start impulse of a permutation code signal, the grid of tube 813 will be rendered sufficiently positive to fire the tube. With tube 813 rendered conductive, the potential of its cathode is suddenly rendered considerably more positive with respect to ground due to current through the cathode resistor. The cathode of tube 813 is connected by conductor 816 to the cathode of an amplifier tube 817, the grid circuit of which is connected across the upper left-hand or secondary winding of transformer 802, and which stands in the same relation to transformer 802 that vacuum tube 803 bears to transformer 801, namely, that tube 817 serves to amplify spacing trains of alternating current impressed on the right-hand or primary winding of transformer 802 through jack 707 from a remote station and induced by the primary winding of transformer 802 into the upper secondary winding. By virtue of the interconnection of the cathodes of tubes 813 and 817 through conductor 816, the cathode of amplifier tube 817 is made considerably more positive with respect to ground, thereby increasing the bias on tube 817 well beyond the cut-off point of that tube so that it is rendered completely unresponsive to any spacing signal which might be received through jack 707 from a remote station. Any attempted transmission of signals through the repeater in the opposite direction from that now being considered is prevented.

The cathode of gas-filled tube 813 is also connected through condenser 818 and conductors 819 and 821 to the cathode of a hot cathode gas-filled trigger tube 822 which is at this time conducting, not because its grid is above the firing potential but because its grid was previously raised momentarily above the firing potential, as will be later described, and it is a characteristic of such tubes that having been fired, they cannot be cut off by reducing the potential of the grid but can only be quenched by opening the external circuit between the anode and cathode or in some other manner reducing the potential difference between the anode and the cathode. Due to the raising of the potential of the cathode of gas-filled tube 813 above ground, an impulse is applied through condenser 818 and conductors 819 and 821 which momentarily makes the cathode of tube 822 more positive with respect to ground than it had previously been, thus reducing the potential difference between the cathode and the anode to a value less than sufficient to sustain current between the anode and cathode so that tube 822 is rendered non-conductive.

The anode circuit of gas-filled tube 822 includes a tapped primary winding of a transformer 823 which is tuned by a condenser 824, and a portion of which is connected between the grid and cathode of an electron discharge tube 826, with the remainder of the transformer primary connected between the cathode and anode of that tube. This will be recognized as an electron tube oscillator circuit and the constants of the primary of the transformer 823 and of condenser 824 are such that the frequency of oscillation is equal to one cycle per impulse interval of a permutation code signal. When gas-filled tube 822 is conducting, the flow of its anode current through the primary winding of transformer 823 prevents tube 826 from generating oscillatory current. However, when tube 822 is rendered non-conductive the oscillator circuit comprising tube 826, transformer primary 823 and condenser 824 begins to oscillate, and its circuit constants are such that it begins substantially at the zero point of the voltage wave substantially without a transient.

The oscillator voltage is impressed on the grid of tube 829 through the secondary winding of transformer 823 poled so that the grid becomes less positive during the first half of the wave. Tube 829 flashes at a part of the wave which is predetermined by the circuit constants. The anode of tube 829 is connected through conductor 831 to one terminal of a condenser 832, the other terminal of which is connected to the anode of a hot cathode gas-filled trigger tube 836. Upon the firing of tube 829, an impulse is delivered through the condenser 832 which reduces the potential of the anode of tube 836 and if this tube has been conducting, it is quenched. The anode circuit of tube 829 includes the primary winding of a transformer 837 which has a plurality of secondary windings. The primary of transformer 837 is shunted by a condenser 838. The condenser 838 delays the building up of a flow of anode current through the primary of transformer 837 until after tube 829 has quenched tube 836 if the latter has been conducting. By the time such quenching action has been accomplished, a sharply peaked impulse passes through the primary winding of transformer 837 and induces a similar impulse in the secondary winding 839. One terminal of secondary winding 839 is connected through biasing batteries to the cathode of gas-filled tube 836 and the other terminal of the secondary winding 839 is connected to one terminal of condenser 808 which, together with resistor 809 in shunt therewith, is connected across the output of full-wave rectifier 807. The other terminal of condenser 808 is also connected to the grid of gas-filled tube 836. The polarity of the impulse generated in transformer secondary 839 is in series-aiding relation to the charge impressed on condenser 808 as a result of rectification of the received start impulse which, being of spacing nature, is represented by received alternating current and the potential across the transformer secondary 839, added to the potential across condenser 808 is sufficient to fire gas tube 836. The reason that tube 829, upon firing, was able to quench tube 836 through condenser 832, although a potential was then being developed across condenser 808 due to the rectification of the start signal, is that the voltage which can be developed across condenser 808 by rectifier 807 is insufficient to fire tube 836. It may also be added that the voltage developed across transformer primary 839 is insufficient to fire tube 836 except when aided by a voltage across condenser 808. Thus the tube 836 can be fired only when a spacing train of alternating current is being received and rectified and can be fired only under the timing control of transformer 837.

The cathode of tube 836 is connected by conductor 837 to the grid of an amplifier tube 838. Tube 838 has a source of alternating current 846 generating oscillatory current at the signaling frequency connected from cathode to ground. When tube 836 is non-conductive, a steady negative bias is applied to the grid of vacuum tube 838 so that the tube is biased well below the cut-off point and even the positive swing of the alternating current from source 846 will not raise the potential of the grid of tube 838 sufficiently to render the tube conducting. However, when tube 836 becomes conductive the potential of the grid of tube 838 is raised sufficiently that tube 838 is rendered conductive, the conductivity being varied in accordance with the control of the cathode potential by the source of oscillatory current 846 and the tube will thus serve as an amplifier of the oscillatory current at the signaling frequency. The anode circuit of tube 838 includes the lower left-hand winding of transformer 802 so that there will be induced in the right-hand winding and transmitted to the cord circuit connected to jack 707 a train of oscillatory spacing current representing the start signal. The duration of this start signal will not be dependent upon reception of a start signal of effective amplitude during the entire start signal interval, since the gas-filled tube 836, having been rendered conductive in consequence of the charging of condenser 808 due to reception of a start signal, at least a portion of which is of effective amplitude, cannot be quenched by grid control even though the received start signal may trail off to insignificant amplitude before the end of the start signal interval, due to distortion. Tube 836 can be cut off only by tube 829 under the control of oscillator tube 826 in a manner heretofore described, whereby there will be allotted to the transmission of the start signal by tube 838, a full start signal interval, which will be recognized as constituting regeneration of the signal.

It will be observed that the cathode return circuit of tube 829 includes a resistor 848 shunted by a condenser 849. Upon the firing of gas-filled tube 829 under the control of oscillator tube 826, the inductance of the primary winding of transformer 837 through which the anode current of tube 829 flows causes condenser 849 to become charged to such potential that the potential difference between the anode and cathode of tube 829 is reduced below the value at which a discharge may be maintained, and tube 829 is quenched. Following the quenching of the tube condenser 849 discharges through resistor 848 which retards the discharge so that tube 829 has time in which to deionize before condenser 849 has completely or almost completely discharged and has thus restored the normal potential difference between the anode and cathode of tube 829. The actual time of firing of tube 829 is just after the oscillator voltage has begun to rise above zero in the positive half cycle. Tube 829, upon being quenched by condenser 849, remains non-conductive under the control of the condenser, due to its slow discharge, until after the oscillator has entered its negative half cycle. Accordingly, tube 829 does not refire in the same positive half cycle, but awaits refiring in the next positive half cycle. As previously stated, the oscillator is adjusted to produce one cycle per impulse interval of a permutation code combination. Thus for each cycle of the oscillator, tube 829 is rendered conductive and remains so only momentarily due to the self-quenching effect of condenser 849, so that a succession of impulses is produced with a time interval between each two impulses equal to the signaling impulse interval of permutation code signals.

Transformer 837 has other secondary windings designated by the reference numerals 851, 852, 853, 854 and 856. Secondary winding 852 of transformer 837 is connected in the grid circuit of a hot cathode gas-filled trigger tube 857, so that tube 857 is fired at the same time that tube 836 is fired in response to the first impulse in the primary winding of transformer 837. The cathode of gas-filled tube 857 is connected through the secondary winding 853 of transformer 837 to the control anode of the first of six cold cathode gas-filled electron discharge tubes, the first tube being designated by the reference numeral 858. The cathode of the first cold cathode tube is connected through the secondary winding 854 of transformer 837 to the control anode of the second cold cathode gas-filled tube 859. The cathode of the second cold-cathode tube 859 is connected to the control anode of the third cold cathode tube 861 through secondary winding 856 of transformer 837. The cathode of tube 858 is connected to ground through resistor 862 shunted by condenser 863. The cathode of tube 859 is connected to ground through resistor 864, shunted by condenser 866. Other cold cathode tubes indicated by the dotted line between tube 861 and the final tube 867 have their cathodes connected to ground through individual resistors shunted by condensers, and the final tube 867 has its cathode connected to ground through resistor 868 shunted by condenser 869. The number of cold cathode tubes employed is determined by the number of signal elements in the permutation code, each tube serving to count one element of the code. Each of the cold cathode tubes except the final tube 867 has its main anode connected to a conductor 871 through a resistor and the final tube has its main anode connected directly to the conductor 871. Conductor 871 is connected through inductance 872 to the positive terminal of battery 873, the negative terminal of which is grounded. From this it will be apparent that the inductance 872 is common to the main anode circuits of all of the cold cathode gas-filled tubes.

Conductor 871 is connected by conductor 874 to one terminal of a condenser 876, the other terminal of which is connected to the anode of hot cathode gas-filled tube 813. A condenser 877 is connected between the anode of hot cathode gas-filled tube 857 and conductor 871 so that when tube 857 is fired substantially simultaneously with tube 836 in response to the start signal, an impulse will be delivered through condenser 877, conductors 871 and 874 and condenser 876 tending to quench tube 813 which is now conductive, it will be remembered, since the start signal now being received and rectified will have raised the potential of the grid of gas-filled tube 813. Such impulse will not be effective to quench tube 813 because it will not be of sufficient amplitude. Tube 813 will remain active until a stronger impulse is impressed upon its plate, which occurs when tube 867 flashes, as will be described hereinafter.

With tube 857 rendered conductive, the control anode of the first cold cathode tube 858, being connected to the cathode of tube 857, will be made more positive with respect to ground due to current in the cathode resistor of tube 857. Tube 858 will not fire at this time because condenser 860 delays the change in potential until after the voltage peak in transformer secondary 853 subsides. Upon the next energization of transformer 837, under the control of oscillator 826, the voltage induced in the secondary winding 853 will be added to that already applied to the control anode of tube 858 from the cathode of tube 857 and the aggregate will be sufficient to fire the control gap of tube 858 which will break down the main gap and cause current to flow in the main anode circuit. Due to the presence of the resistor connected between the main anode of tube 858 and conductor 871, the potential of conductor 871 will not be materially reduced as the space discharge potential in tube 858 drops from the firing to the sustaining potential so that no impulse will be impressed on condensers 876 or 877 of sufficient magnitude to quench tubes 813 and 857, respectively.

The firing of tube 858 serves as a tallying or registration of the second cycle of oscillator 826 and results from the secondary momentary firing of discharge tube 829. At this time the repeater will be receiving the first code impulse of the code combination which will be assumed to be of marking nature, which is represented by a no-current condition in the left-hand winding of transformer 801. The tube 829 upon being momentarily fired, quenches gas-filled tube 836 through conductor 831 and condenser 832. Since the signaling impulse is of marking nature, no alternating current will be impressed upon rectifier 807 and accordingly no voltage will be built up across condenser 808 from the rectifier. Simultaneously with the firing of tube 858, through transformer secondary winding 853, a pulse will be induced in the secondary winding 839 of the transformer which will be impressed on the grid circuit of tube 836. The voltage of this pulse is of insufficient magnitude to fire tube 836 in the absence of a voltage across condenser 808 and accordingly tube 836 will not be fired. With the quenching of tube 836 its cathode became more negative, thus biasing the grid of vacuum tube 838 through conductor 837 to the cut-off point so that oscillatory current from source 846 is withheld from transformer 802 and a no-current condition representing a marking impulse is produced in the right-hand winding of transformer 802. Had the received first code impulse been of spacing nature, the same as the start impulse, tube 836 would have been quenched momentarily by tube 829 but grid control resulting from the voltage induced in secondary winding 839 of transformer 837 added to the voltage across condenser 808 would have refired the tube. Condenser 847 and resistor 850 associated with the grid circuit of amplifier tube 838 slightly delay the cutting off of tube 838 when tube 836 is quenched, so that when there are successive spacing impulses to be repeated tube 838 will be sustained during the mometary extinguishment of tube 836 and will afford continuity between the two spacing signals.

Gas-filled tube 836 and vacuum tube 838 remain in the condition established under the control of the first code impulse of the code combination until tube 829 is again fired under the control of the oscillator 826 at which time the second code impulse of the signal combination is being received and the second cold cathode gas-filled tube 859, having had its control anode made more positive with respect to ground due to current through the cathode resistor 862 of tube 858, is fired by the voltage induced in transformer secondary winding 854. Tubes 836 and 838 are conditioned in accordance with the code impulse then being received and the tube 859 registers the fact that this is the second code impulse of the code combination, there being three remaining code impulses to be received followed by the stop impulse which is of marking nature. The reception and retransmission of the remaining code impulses are registered or tallied by the third cold cathode tube 861 and by the other cold cathode tubes indicated but not shown.

Upon the actuation of tube 829 following retransmission of the last selecting code impulse, the final cold cathode gas-filled tube 867 is fired and tube 836 is quenched without fail if it has been conductive for the final code impulse of the code combination, since the stop impulse is of marking nature and there is no voltage across condenser 868 to aid the voltage induced in transformer secondary 839. Accordingly, tube 838 is unfailingly biased to cut-off. The anode circuit of cold cathode tube 867 differs from the anode circuits of the other cold cathode tubes in that no resistor is included between the main anode and the conductor 871. At the instant that the main gap of tube 867 becomes conductive, there is no current in the cathode resistor 868 of tube 867 so that no voltage exists across condenser 869. Accordingly, the full voltage between conductor 871 and ground exists between the main anode and cathode of tube 867. However, it is a characteristic of cold cathode gas-filled tubes that immediately upon firing, the main gap potential decreases to the discharge sustaining potential. Since condenser 869 has not yet had time to absorb the difference between the discharge sustaining potential and the potential which existed between conductor 871 and ground just before tube 867 fired and there is no resistor between the anode of tube 867 and conductor 871 which can absorb this decrease in potential, it must follow that the potential of conductor 871 with respect to ground is decreased, and such decrease, applied through conductor 874 and condenser 876 to the anode of gas-filled tube 813 quenches that tube and also quenches tube 857 through condenser 877. Also due to the reduction in the potential of conductor 871, the potential of the main anode of each of the other cold cathode tubes with respect to its cathode is reduced below the discharge sustaining potential so that those tubes are also quenched. The sudden cutting off of current through all but the final one of the cold cathode tubes which have the inductance 872 common to their anode circuit results in a decrease of current through inductance 872 which accordingly develops a counter-electromotive force tending to sustain such current and therefore in series-aiding relation to battery 873. Since the only conductive path for the dissipation of this counter-electromotive force is through the main anode discharge path of tube 867, the anode current in this tube rises to a value above that which would be produced by battery 873 alone and the flow of this current through cathode resistor 868 raises the voltage across condenser 869 to a higher value than would appear across the condenser if the inductance 872 were not present. When the counter-electromotive force in inductance 872 has been dissipated, the voltage between conductor 871 and ground returns to the voltage of battery 873. However, since the condenser 869 carries a larger voltage at this time than it normally would have, the distribution of voltages between conductor 871 and ground is such that the voltage between the main anode of tube 867 and its cathode is below the discharge sustaining potential. Accordingly, tube 867 becomes quenched and condenser 869 then discharges through resistor 868.

The cathode of tube 867 is connected through conductor 881 and condenser 882 to the grid of gas-filled tube 822. Prior to the quenching of tube 867, and while it was conducting anode current, the potential of its cathode was more positive than ground due to the flow of current through the cathode resistor. This more positive potential than ground applied over conductor 881 and through condenser 882 raises the potential of the grid of tube 822 above the firing potential so that tube 822 is rendered conductive as a result of the tallying of the stop impulse and the anode current of tube 822 flowing through the primary of transformer 823, which is the inductive portion of the character timing oscillator, stops the generation of oscillatory current for timing the impulses of a code combination. The oscillator is critically damped and stops substantially without a transient. Thus the regenerative repeater is restored to the initial condition with none of the tubes therein conductive except the tube 822, and the circuit awaits the reception of the next code combination.

When signals are received in the right-hand winding of transformer 802 through jack 707 to be repeated in regenerative manner and retransmitted through jack 702 such signals are received by transformer 802 and are amplified by tube 817. The anode circuit of tube 817 includes the primary winding of a transformer 886 which corresponds to the transformer 806 and which is provided with two secondary windings. The upper secondary winding works into a full-wave rectifier 887, the output of which controls the hot cathode gas-filled trigger tube 888 jointly with impulses supplied from transformer 837 through the secondary winding 851. Tube 888 corresponds to tube 836. The lower secondary winding of transformer 886 has rectifiers associated therewith for charging condenser 889 to control hot cathode gas-filled trigger tube 891 which corresponds to tube 813 and which is effective in response to the start impulse of a code combination for disabling tube 803 which amplifies signals received over conductors 833 and 834 so that there can be no interference with the transmission of a complete code combination.

The impulse timing and counting circuit comprising start tube 822, oscillator 826, oscillator impulse detector tube 829, and counting chain tubes 857, 858, 859, 861 and 867 are common to both of the retransmitting tubes 836 and 888 and to both the intercircuit preventing tubes 813 and 891, the intercircuit controls previously described being effective over the common conductors 819, 831 and 874.

Although certain specific embodiments of the invention have been shown in the drawings and described in the foregoing specification, it will be understood that the invention is not limited to such specific embodiments but is capable of modification, rearrangement and substitution of parts and elements without departing from the spirit of the invention and within the scope of the appended claims.

What is claimed is:

1. In a signaling system for transmitting oscillatory signaling current, a signal transferring device adapted to transfer only oscillatory current, a rectifier device for deriving a unidirectional potential from oscillatory current transferred by said transferring device, a source of oscillatory signaling current, and keying means controlled in accordance with the operation of said rectifier device for controlling transmission from said source.

2. In a repeater for signals comprising trains of oscillatory current, means for rectifying received trains of oscillatory current, a source of oscillatory signaling current, and keying means controlled in accordance with the operation of said rectifying means for controlling oscillatory current signal retransmission from said source.

3. In a signaling channel for transmitting oscillatory signaling currents, a signal transposing device comprising a full-wave rectifier for rectifying signaling current flowing into said channel, means for generating oscillatory signaling currents to be transmitted onwardly through said channel, and means controlled by said rectifier when rectifying signaling current flowing into said channel for estopping the flow of signaling current onwardly through said channel from said source.

4. In a signaling channel for transmitting oscillatory signaling currents, a signal transposing device comprising a full-wave rectifier for rectifying signaling current flowing into said channel, means for generating oscillatory signaling current to be transmitted onwardly through said channel, and a condenser in the output of said rectifier chargeable thereby to estop the flow of oscillatory current onwardly through said channel from said source during rectification of signaling current flowing into said channel.

5. In a signaling channel for transmitting oscillatory signaling current, a signal transposing device comprising a full-wave rectifier for rectifying oscillatory signaling current received over said channel from the remote end thereof, means for generating oscillatory current to be transmitted onwardly through said channel, a condenser in the output of said rectifier chargeable thereby to estop the flow of oscillatory current onwardly through said channel from said source during rectification of signaling current received over said channel from the remote end, a supervisory relay controlled according to the potential developed across said condenser by said rectifier, and means controlled by said relay for registering supervisory operation of said relay.

6. In a regenerative repeater for telegraph signals comprising trains of alternating current, means for rectifying received trains of oscillatory current, a normally deactivated source of timing impulses having a frequency corresponding to the desired telegraph code impulse frequency, means controlled by said rectifying means for activating said source of timing impulses, means for counting the timing impulses produced by said source, a source of oscillatory signaling current, means for keying said source of oscillatory signaling current, and means controlled jointly by said rectifying means and said source of timing impulses for controlling said keying means.

7. In a regenerative repeater for telegraph signals comprising trains of oscillatory current, means for rectifying said trains of oscillatory current, a normally deactivated source of timing impulses having a frequency corresponding to the desired telegraph code impulse frequency, means for activating and deactivating said source of timing impulses, means controlled by said rectifying means for causing said activating and deactivating means to activate said source of timing impulses, means for counting the timing impulses produced by said source, a source of oscillatory signaling current, means for keying said source of oscillatory signaling current, means controlled jointly by said rectifying means and said source of timing impulses for controlling said keying means, and means controlled by said counting means upon counting a predetermined number of said timing impulses for causing said activating and deactivating means to deactivate said source of timing impulses.

8. In a regenerative repeater for telegraph signals comprising trains of oscillatory current, means for rectifying said signals, a normally deactivated source of oscillatory timing current having a frequency corresponding to the desired telegraph code impulse frequency, means for activating and deactivating said source of oscillatory timing current, means controlled by said rectifying means for causing said activating and deactivating means to activate said source of oscillatory timing current, means for deriving a momentary timing impulse from each cycle of current generated by said source of oscillatory timing current, means for counting said impulses, a source of oscillatory signaling current, means for keying said source of oscillatory signaling current, means controlled jointly by said rectifying means and said impulse deriving means for controlling said keying means, and meas controlled by said counting means upon counting a predetermined number of impulses for causing said activating and deactivating means to deactivate said source of oscillatory timing circuit.

9. In a regenerative repeater for telegraph signals comprising trains of oscillatory current, two rectifiers for simultaneously and independently rectifying received trains of oscillatory current, a normally deactivated source of timing impulses having a frequency corresponding to the desired telegraph code impulse frequency, means for activating and deactivating said source of timing impulses, means controlled by one of said rectifiers for causing said activating and deactivating means to activate said source of timing impulses, means for counting the timing impulses produced by said source, a source of oscillatory signaling current, means for keying said source of oscillatory signaling current, means controlled jointly by the other of said rectifiers and said source of timing impulses for controlling said keying means, and means controlled by said counting means upon counting a predetermined number of impulses for causing said activating and deactivating means to deactivate said source of timing impulses.

10. In a regenerative repeater for telegraph signals comprising trains of oscillatory current, means for rectifying received trains of oscillatory current, a normally deactivated source of oscillatory timing current having a frequency corresponding to the desired telegraph code impulse frequency, means for activating and deactivating said timing current source, means controlled by said rectifying means for causing said activating and deactivating means to activate said timing current source, an electron discharge tube activated once for each cycle of timing current from said source, means for counting the successive activations of said tube, a source of oscillatory signaling current, means for keying said source of oscillatory signaling current, an electron discharge tube deactivated by said first-mentioned electron discharge tube if conductive at the time of activation of said first-mentioned electron discharge tube and subject to immediate reactivation under the joint control of said first-mentioned electron discharge tube and said rectifying means for controlling said keying means, and means controlled by said counting means upon counting a predetermined number of activations of said first-mentioned electron discharge tube for causing said activating and deactivating means to deactivate said timing current source.

11. In a regenerative repeater for telegraph signals comprising trains of oscillatory current, means for rectifying received trains of oscillatory current, a normally deactivated source of oscillatory timing current having a frequency corresponding to the desired telegraph code impulse frequency, means for activating and deactivating said timing current source, means controlled by said rectifying means for causing said activating and deactivating means to activate said timing current source, an electron discharge tube activated once for each cycle of timing current from said source, means for counting the successive activations of said tube, a source of oscillatory signaling current, means for keying said source of oscillatory signaling current, an electron discharge tube deactivated by said first-mentioned electron discharge tube if conductive at the time of activation of said first-mentioned electron discharge tube and subject to immediate reactivation under the joint control of said first-mentioned electron discharge tube and said rectifying means for controlling said keying means, means associated with said keying means for momentarily delaying response of said keying means to deactivation of said second-mentioned electron discharge tube whereby to afford continuity of signal transmission attending immediate reactivation of said second electron discharge tube, and means controlled by said counting means upon counting a predetermined number of activations of said first-mentioned electron discharge tube for causing said activating and deactivating means to deactivate said source of timing current.

12. In a regenerative repeater for telegraph signals comprising trains of oscillatory current, a pair of transformers each terminating a telegraph line, means associated with each transformer for rectifying oscillatory current received over its associated line, means associated with each transformer for impressing oscillatory signaling current on its associated line, a normally deactivated source of oscillatory timing current having a frequency corresponding to the desired telegraph code impulse frequency, means for activating and deactivating said timing current source, means controlled by each of said rectifying means upon response thereof to signals impressed on its transformer by its associated line for withholding signals from the rectifying means associated with the other transformer and for causing said activating and deactivating means to activate said timing current source, means for counting the timing impulses produced by said source, means controlled jointly by said source of timing impulses and the rectifying means associated with either of said transformers for activating the signal impressing means associated with the other of said transformers, and means controlled by said counting means upon counting a predetermined number of timing impulses for causing said activating and deactivating means to deactivate said source of timing impulses.

LELAND C. ROBERTS.

REFERENCES CITED

The following references are of record in the file of this patent:

UNITED STATES PATENTS

| Number | Name | Date |
|---|---|---|
| 1,521,671 | Deardorff | Jan. 6, 1925 |
| 1,521,685 | Hamilton | Jan. 6, 1925 |
| 2,404,754 | Simpson | July 23, 1946 |
| 2,417,543 | Chapin | Mar. 18, 1947 |
| 2,495,805 | Bliss | Jan. 31, 1950 |